Aug. 24, 1954     E. L. TUCKER     2,687,081
WEINER ROLL BAKING PAN
Filed May 29, 1953
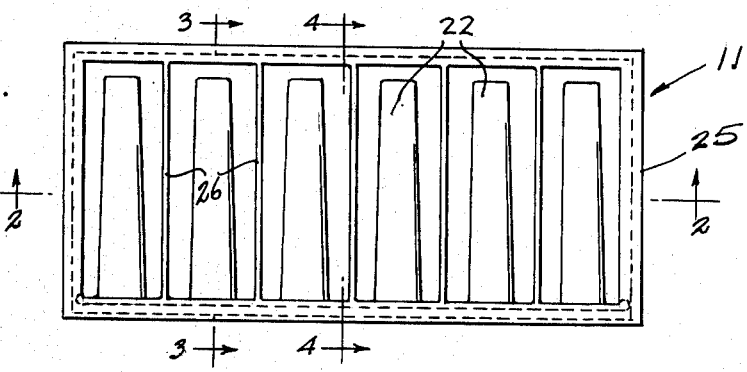
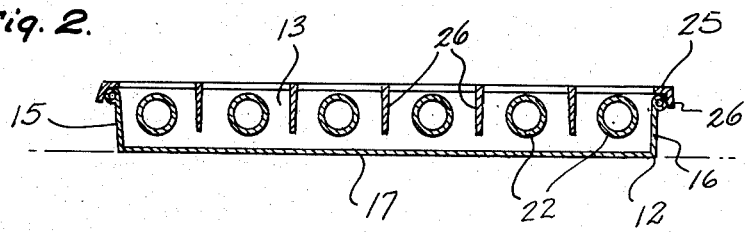
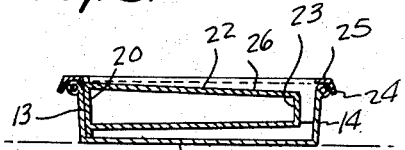
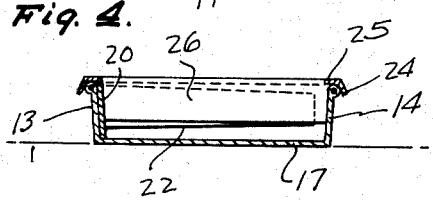
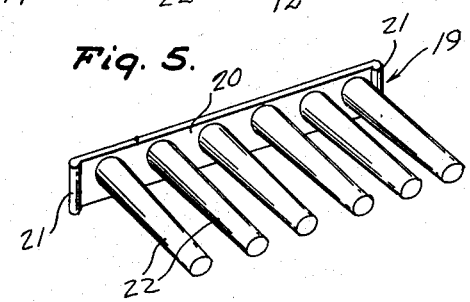
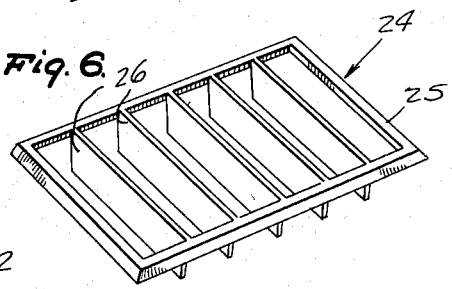
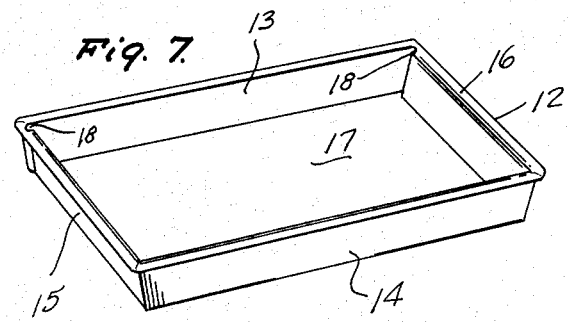
INVENTOR.
*Eugene L. Tucker,*
BY
*McMorrow, Berman & Davidson*
*Attorneys.*

Patented Aug. 24, 1954

2,687,081

UNITED STATES PATENT OFFICE 2,687,081

WIENER ROLL BAKING PAN

Eugene L. Tucker, Washington, D. C.

Application May 29, 1953, Serial No. 358,258

1 Claim. (Cl. 99—439)

This invention relates to baking pans, and more particularly to an improved pan for baking wiener rolls.

The main object of the invention is to provide a novel and improved wiener roll baking pan which is simple in construction, which involves only a few parts, and which is arranged to efficiently and rapidly bake a plurality of wiener rolls and which is further arranged so that the wiener rolls may be easily removed from the pan after baking without excessively distorting or breaking the rolls.

A further object of the invention is to provide an improved wiener roll baking pan which involves inexpensive components, which is sturdy in construction, which is easy to clean, and which provides economical utilization of dough as well as providing a thoroughly baked and wholesome product.

Further objects and advantages of the invention will become apparent from the following description and claim, and from the accompanying drawings, wherein:

Figure 1 is a top plan view of an improved wiener roll baking pan constructed in accordance with the present invention.

Figure 2 is a longitudinal vertical cross sectional view taken on the line 2—2 of Figure 1.

Figure 3 is a transverse vertical cross sectional view taken on the line 3—3 of Figure 1.

Figure 4 is a transverse vertical cross sectional view taken on the line 4—4 of Figure 1.

Figure 5 is a perspective view of the core unit employed in the baking pan of Figure 1.

Figure 6 is a perspective view of the roll separator unit employed in the baking pan of Figure 1.

Figure 7 is a perspective view of the main receptacle or container of the baking pan assembly of Figure 1.

Referring to the drawings, 11 generally designates a wiener roll baking pan assembly constructed in accordance with the present invention.

The wiener roll baking assembly comprises the main pan or receptacle 12, said pan 12 being generally rectangular in shape, having the opposed longitudinal walls 13 and 14, the opposed transverse end walls 15 and 16, and the bottom wall 17. As shown in Figure 7, the walls 13, 14, 15 and 16 slope upwardly and outwardly, to facilitate the removal of the baked product therefrom.

The corners of the receptacle 12 are formed adjacent the longitudinal wall 13 with the opposing grooves 18, 18, said grooves being disposed adjacent the plane of the longitudinal wall 13. Designated generally at 19 is a core member comprising a plate element 20 formed at its ends with the respective ribs 21, 21 adapted to be slidably received in the grooves 18, 18, whereby the plate element 20 will be disposed substantially in contact with the longitudinal wall 13. Secured on the plate element 20 are the evenly spaced core elements 22, said core elements being generally conical in shape and being provided with the end walls 23 located a short distance from the longitudinal wall 14 of the receptacle 12 when the core assembly 19 is disposed in the receptacle 12, as will be presently described.

Designated generally at 24 is a separator unit comprising a rectangular frame 25 flanged downwardly around its periphery, as shown at 26, and adapted to be disposed on the top rim of the receptacle 12 in the manner illustrated in Figure 2. Secured transversely to the longitudinal elements of the frame 25 and spaced evenly therealong are the depending blade members 26, said blade members being spaced so as to be arranged midway between adjacent core elements 22 when the separator member 24 is mounted on the receptacle 12 with the core assembly 19 disposed therein, as illustrated in Figure 2. As further shown in Figure 2, the blade members 26 terminate a short distance above the bottom walls 17 of the pan.

In using the apparatus, all the parts are greased slightly with shortening or cooking oil, or similar lubricating material. The dough is rolled or cut to define two strips, one strip being placed in the bottom of the receptacle 12 and being of a shape to fit the bottom of the receptacle. The core assembly 19 is then placed in the pan, the ribs 21, 21 of the plate element 20 being received in the grooves 18, 18 and the core assembly being allowed to descend so that the respective core elements 22 are engaged with the strip of dough in the bottom of the pan. The second strip of dough, also shaped to fit in the receptacle 12, is then placed over the hollow conical core elements 22 and is arranged so that it makes contact with the first strip of dough between the spaced cone elements 22. The said second strip of dough is also arranged so that its ends engage the first strip of dough adjacent the respective transverse end walls 15 and 16 of the receptacle 12. The spacer member 24 is then mounted on the rim of the receptacle 12 with the transverse separator blades 26 engaging between the adjacent cores 22 in the manner illustrated in Figures 1 and 2. The separator member 24 is pressed lightly until the frame element 25 thereof rests on the rim of the receptacle 12, whereby the blades 26 separate the sections of dough surrounding the respective hollow core elements 22. The apparatus is then placed in the oven for baking and is removed after the baking has been completed.

After the baking operation, the product may be removed from the apparatus by first removing the separator member 24, and then inverting the receptacle 12, allowing the baked product containing the cores 22 to be removed from the receptacle 12. After the product has thus been removed, the core assembly 19 is disengaged from the baked product by sliding the core elements 22 out of the molded apertures formed in the product by said core elements. The resultant product comprises a plurality of wiener rolls which are partially attached to each other and which may be readily detached as required. Each of the detached segments constitutes a roll having an elongated recess therein for receiving a wiener.

The improved wiener roll thus obtained is considerably more convenient to use than the conventional wiener roll, since it is easier to handle and usually does not require any extra wrapping in order to prevent loss of the sauces or ingredients that ordinarily go into a wiener sandwich.

While a specific embodiment of an improved device for baking wiener rolls has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A frankfurter roll baking pan comprising: a rectangular receptacle having a flat bottom wall and having opposed longitudinal walls and opposed transversely extending end walls projecting upwardly from the bottom wall at the periphery of the bottom wall, said longitudinal and end walls being integrally connected at their ends to define a continuously extending upper edge upon said receptacle, said upper edge being formed with a continuous bead and said bead being formed with recesses confronting one another and located at opposite ends of the pan at one side thereof; a core member removably engaged in the receptacle and including a plate element coextensive in area with one of said longitudinal walls and overlying said one longitudinal wall inside the receptacle, said plate being formed at opposite ends with ribs complementary to said grooves and slidably engageable in the grooves to hold said plate in position against its associated longitudinal wall of the receptacle, the core member additionally including a plurality of core elements extending laterally of the core member within the receptacle and spaced uniformly apart longitudinally of the plate, said core elements extending from the plate intermediate the top and bottom edges of said plate so as to be spaced above the bottom wall of the receptacle, the core elements terminating, at those ends thereof remote from the plate, short of the other longitudinal wall of the receptacle; and a separator comprising a rectangular, open frame having a depending, continuous flange at its outer periphery seating against said bead of the receptacle to support the frame upon the upper edge of the receptacle, said frame overlying the ribs and grooves at opposite ends of the frame, the separator further including blade members depending from the frame, the blade members being spaced equal distances apart longitudinally of the frame and occurring between the core elements, said blade members having their upper edges in the plane of the frame, the blade members being fixedly secured at opposite ends of said upper end edges thereof to opposite sides of the frame and having their lower edges terminating in spaced relation to the bottom wall of the receptacle.

References Cited in the file of this patent

UNITED STATES PATENTS

| Number | Name | Date |
|---|---|---|
| 1,015,892 | Jefferson | Jan. 30, 1912 |
| 1,690,882 | Wear | Nov. 6, 1928 |
| 1,696,343 | Burdick | Dec. 25, 1928 |
| 1,975,031 | Wilkes et al. | Sept. 25, 1934 |